US009347829B2

(12) United States Patent
Loncar et al.

(10) Patent No.: US 9,347,829 B2
(45) Date of Patent: May 24, 2016

(54) INTEGRATED NANOBEAM CAVITY ARRAY SPECTROMETER (75) Inventors: Marko Loncar, Belmont, MA (US); Qimin Quan, Cambridge, MA (US); Parag B. Deotare, Medford, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 175 days.

(21) Appl. No.: 13/696,367

(22) PCT Filed: May 9, 2011

(86) PCT No.: PCT/US2011/035695
§ 371 (c)(1),
(2), (4) Date: Mar. 7, 2013

(87) PCT Pub. No.: WO2011/140544
PCT Pub. Date: Nov. 10, 2011

(65) Prior Publication Data
US 2013/0176554 A1    Jul. 11, 2013

(51) Int. Cl.
*G01B 9/02* (2006.01)
*G01J 3/26* (2006.01)
*B82Y 20/00* (2011.01)
*G02B 6/122* (2006.01)
*G02B 6/12* (2006.01)

(52) U.S. Cl.
CPC . *G01J 3/26* (2013.01); *B82Y 20/00* (2013.01); *G02B 6/1225* (2013.01); *G02B 6/12011* (2013.01); *G02B 2006/12069* (2013.01); *G02B 2006/12097* (2013.01)

(58) Field of Classification Search
CPC ......... G01J 3/2803; G01J 3/2823; G01J 3/26; B82Y 20/00; G02B 6/12011; G02B 6/1225; G02B 6/125; G02B 2006/12069; G02B 2006/12097; G02B 6/2808; G02B 6/2813
See application file for complete search history.

(56) References Cited

U.S. PATENT DOCUMENTS

| 4,054,389 | A | * | 10/1977 | Owen | 356/419 |
| 4,760,580 | A | * | 7/1988 | Thompson et al. | 372/50.12 |
| 4,787,699 | A | * | 11/1988 | Moulin | 385/80 |
| 4,974,961 | A | * | 12/1990 | Jackson et al. | 356/477 |
| 5,233,453 | A | * | 8/1993 | Sivarajan et al. | 398/55 |
| 5,265,177 | A | * | 11/1993 | Cho et al. | 385/14 |
| 5,546,483 | A | * | 8/1996 | Inoue et al. | 385/14 |
| 5,606,633 | A | * | 2/1997 | Groger et al. | 385/12 |
| 5,917,973 | A | * | 6/1999 | Iwasaki | 385/45 |
| 6,125,228 | A | | 9/2000 | Gong | |

(Continued)

OTHER PUBLICATIONS

M. Loncar, P.B. Deotare, M.W. McCutcheon, M. Khan, Y. Zhang, I.W. Frank, T. Babinec, D.E. Chang, M.D. Lukin, "High Quality Factor Photonic Crystal Nanobeam Cavities and their Applications," in Advances in Optical Sciences Congress, OSA Technical Digest (CD) (Optical Society of America, 2009), paper IMF4.*

(Continued)

*Primary Examiner* — Michael A Lyons
(74) *Attorney, Agent, or Firm* — Wolf, Greenfield & Sacks, P.C.

(57) ABSTRACT

An on-chip integrated nanobeam cavity array spectrometer (INAS) having an array of waveguide-coupled nanobeam cavities. Waveguide splitters are used to bring the signal from the input waveguide into each cavity. The spectrum of unknown input signal is obtained by collecting signal from each nanobeam cavity in the array.

16 Claims, 4 Drawing Sheets

(56) References Cited

U.S. PATENT DOCUMENTS

| | | | |
|---|---|---|---|
| 6,195,187 B1 | 2/2001 | Soref | |
| 6,407,855 B1 | 6/2002 | MacCormack | |
| 7,116,867 B2* | 10/2006 | Takahashi | 385/45 |
| 2004/0234265 A1 | 11/2004 | Shin | |
| 2006/0198567 A1* | 9/2006 | Levy et al. | 385/12 |
| 2013/0094801 A1* | 4/2013 | Morris | 385/14 |

OTHER PUBLICATIONS

Kyotoku, B.B.C., L. Chen, and M. Lipson, "Sub-nm resolution cavity enhanced microspectrometer," Optics Express, 18(1): p. 102-107 (2010).

Quan Q, D.P.B., Loncar M, "Photonic Crystal Nanobeam Cavity Strongly Coupled to the Feeding Waveguide," Applied Physics Letters, (2010).

Belotti, M., et al., "All-optical switching in silicon-on-insulator photonic wire nano-cavities," Optics Express, 18(2): p. 1450-1461 (2010).

Marki, I., et al., "Optically tunable microcavity in a planar photonic crystal silicon waveguide buried in oxide," Optics Letters, 31(4): p. 513-515 (2006).

Unterreithmeier, Q.P., E.M. Weig, and J.P. Kotthaus, "Universal transduction scheme for nanomechanical systems based on dielectric forces," Nature, 458(7241): p. 1001-1004 (2009).

McNab, S.J., N. Moll, and Y.A. Vlasov, "Ultra-low loss photonic integrated circuit with membrane-type photonic crystal waveguides," Optics Express, 11(22): p. 2927-2939 (2003).

Schmidt, B., et al., "Compact electro-optic modulator on silicon-on-insulator substrates using cavities with ultra-small modal volumes," Optics Express, 15(6): p. 3140-3148 (2007).

International Search Report and Written Opinion from International Application No. PCT/US2011/035695 mailed Jan. 9, 2012.

International Preliminary Report on Patentability from International Application No. PCT/US2011/035695 mailed Nov. 22, 2012.

Chong et al., Tuning of photonic crystal waveguide microcavity by thermooptic effect. IEEE Photonics Tech Letters. Jun. 2004. 16(6):1528-30. DOI: 10.1109/LPT.2004.826781.

Frank et al., Programmable photonic crystal nanobeam cavities. Opt Express. Apr. 12, 2010;18(8):8705-12. doi:10.1364/OE.18.008705.

Iwamoto et al., Observation of micromechanically controlled tuning of photonic crystal line-defect wave guide. Applied Physics Letters. 2006. 88(1): 011104. DOI: 10.1063.1.2159570.

Levy et al., Mechanical tuning of two-dimensional phototonic crystal cavity by micro Electro mechanical flexures. Sensors and Actuators A: Physical. Sep. 12, 2007. 139 (1-2): 47-52.

Momeni et al., Integrated photonic crystal spectrometers for sensing applications. Optics Communications. 2009. 282(15): 3168-71.

Shoji et al., Low loss mode size converter from 0.3 μm square Si wire waveguides to singlemode fibres. Electron Letters. Dec. 5, 2002. 38 (25): 1669-70. DOI: 10.1049/e1:20021185.

Subramania et al., Tuning the microcavity resonant wavelength in a two-dimensional photonic crystal by modifying the cavity geometry. Appl. Phy. Lett. Dec. 2003. 83(22): 4491-3. DOI: 10.1063/1.1630842.

Tanabe et al., All-optical switches on a silicon chip realized using photonic crystal nanocavities. Appl. Phys. Lett. Oct. 10, 2005. 87(15): 151112. DOI: 10.1063/1.2089185.

Tanabe et al., Low power and fast electro-optic silicon modulator with lateral p-i-n embedded photonic crystal nanocavity. Optics Express. Dec. 7, 2009. 17(25): 22505-13. DOI: 10.1364/0E.17.022505.

* cited by examiner

INTEGRATED NANOBEAM CAVITY ARRAY SPECTROMETER

CROSS-REFERENCE TO RELATED APPLICATIONS

The present application is a national phase filing under 35 U.S.C. §371 of International Application No. PCT/US11/35695, filed May 9, 2011, entitled "Integrated Nanobeam Cavity Array Spectrometer", which claims the benefit of the filing date of U.S. Provisional Application Ser. No. 61/332,266 entitled "Integrated Nanobeam Cavity Array Spectrometer" and filed on May 7, 2010.

The above cross-referenced related application is hereby incorporated by reference herein in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to spectrometers and more particularly to a novel type of on-chip spectrometer that combines features of Fabry-Perot (FP) spectrometers with those of grating spectrometers.

2. Brief Description of the Related Art

Integrated optical spectrometers, in particular on-chip spectrometers, have wide applications in sensing, spectral analysis, signal processing, etc. Fabry-Perot spectrometers use high finesse, tunable, optical resonators to sweep cavity resonance over the spectrum of the signal to be analyzed, and in that way map the spectral content of the signal to the time domain. Grating spectrometers, on the other hand, map the spectral content of the signal into the spatial domain using gratings.

On-chip spectrometers have been realized using superprism effects with a diffraction compensation and negative refraction. See, Momeni, B., et al., "*Integrated photonic crystal spectrometers for sensing applications*," Optics Communications, 282(15): p. 3168-3171 (2009). Nevertheless, super-prism based spectrometers are not able to provide complete separation of the adjacent wavelength channels. On-chip spectrometers have also been realized with micro-ring resonators (as wavelength separators) and combined with an on-chip planar diffraction grating that couples the spectrally resolved output signal to a waveguide array, with large insertion loss (~20 dB) due to scattering from the Fresnel lens. See, Kyotoku, B. B. C., L. Chen, and M. Lipson, "*Sub-nm resolution cavity enhanced microspectrometer*," Optics Express, 18(1): p. 102-107 (2010).

SUMMARY OF THE INVENTION

In a preferred embodiment, the present invention is a novel type of on-chip spectrometer that combines features of Fabry-Perot (FP) spectrometer with grating spectrometer. Advantages of the present invention include, but are not limited to, its small size and potential for integration of photonic and electronic functionalities side-by-side on a single substrate. In this way, the entire spectrometer module can be implemented on a very small microchip.

An efficient spectrometer needs to have following features:
(1) High spectral resolution to allow for accurate reconstruction of the spectrum of an unknown input optical signal.

(2) Good signal-to-noise ratio which relies on an efficient collection of the input optical signal as well as effective isolation of the signal from stray light. This will allow that the spectra can be taken even with low-level input signals.

(3) Fast operation, in order to enable rapid spectrum acquisition.

To realize this novel on-chip spectrometer and to fulfill the requirement of an efficient spectrometer, the present invention takes advantage of a high-quality factor (and high-finesse) optical resonator (similarly to FP spectrometer), but instead of sweeping the cavity resonance, it realizes a large number of optical cavities, each tuned to a slightly different wavelength. In this way, the present invention, referred to as an Integrated Nanobeam Array Spectrometer (INAS), can map the spectral content of the optical signal into spatial domain, similar to grating spectrometer.

Therefore, using INAS, the discretized spectrum of the incoming optical signal, can be evaluated with very high resolution at number of different points. The spectrum of the signal, between discrete data points, can be then obtained by sweeping the cavity resonance over narrow wavelength range using for example temperature control or carrier injection, which is described below.

In a preferred embodiment, the present invention is an integrated nanobeam array spectrometer (INAS). Each individual nanobeam cavity is tuned to one wavelength of interest and is used as a spectral filter. In that sense each nanobeam cavity plays the role of Fabry-Perot spectrometer.

To capture the whole spectrum of incoming optical signals, an array of nanobeam cavities is used. In addition, each resonator can be tuned using various tuning mechanisms (described below) to cover wider wavelength range.

Photonic crystal nanobeam cavities can have quality factor (Q) as high as 1,000,000, which sets their resolution to one part per million (ppm) of the center wavelength. This is much better than the resolution of grating spectrometer, and more importantly, it is achieved on footprint that is on the order of 1 $mm^2$.

Photonic crystal nanobeam cavities can have very high throughput (>90%) and simultaneously ultra-high Q. See, Quan Q, D. P. B., Loncar M, "*Photonic Crystal Nanobeam Cavity Strongly Coupled to the Feeding Waveguide*," Applied Physics Letters, (2010). This is ideal and is compatible with the requirements for high spectral resolution and large throughput in order to resolve low-power input signals.

Additional advantages when compared to ring-resonator spectrometers are as follows:

(1) Much smaller footprint, more than 10-times smaller than ring resonators. Therefore, they are ideally suited for large-scale on-chip integration needed from on-chip spectrometers.

(2) Nanobeam resonators are wavelength-scale resonators and therefore they can support only one mode in the operating wavelength of interest. That is they have free-spectral range that can be much larger than that of ring-resonators that are by-design multimode. Therefore, nanobeam resonators minimize cross-talk between different spectrometer channels.

(3) Nanobeam resonators can be designed to emit light vertically towards the detector array positioned above. These detectors can be integrated on the same chip which further reduces the size and simplifies the design since no additional grating couplers are needed. This takes advantage of integration of photonic and electronic functionalities on the same chip.

In a preferred embodiment, the present invention is an optical device that is structured on the micro or nanoscale to localize light in a modal volume where constructive interference produces optical resonance as a means of spectrally separating incoming signals, wherein separated signals are further transferred to different channels. Each of the nanobeam cavities may comprise a silicon ridge waveguide having a plurality of nano-holes patterned along the waveguide, wherein holes in the center of the cavity are largest and the holes taper monotonically to both ends. The geometry of the micro- or nanoscale structure may be selected from one of the following: a photonic crystal defect cavity, a photonic crystal nanobeam cavity, a ring resonator, a Fabry-Perot cavity, or any other kind of geometry that produces an optical microcavity structure. The material may be one of the following: silicon, silica, silicon nitrate, diamond, doped glass, high-index glass, quartz, polymer, polydimethylsiloxane, InP, III-V materials. The optical micro-cavities may be formatted in arrays, or in matrix. The resonance frequency may be in the visible, in the near-infrared, in the mid-infrared, in the UV or in Gigahertz range. The resonance frequency of each cavity can be reconfigured mechanically, by heating, by carrier injection, or by nonlinear optical processes. Each micro-cavity may be individually excited, or simultaneously excited, where the micro-cavities are excited using optical fibers, tapered optical fibers, or through focused or non-focused optical beams. A signal from each micro-cavity may be transferred to optical waveguides, arrays of optical fibers, imaging arrays, or detector arrays.

In another embodiment, the present invention is a method for spectrally separate incoming signals using arrays of optical micro-cavities, and mapping the spectrally separated signals to spatially separated wave-guiding devices or imaging devices.

In a preferred embodiment, the present invention is a method for spectrally separating incoming signals using arrays of optical micro-cavities, and mapping the spectrally separated signals to spatially separated wave-guiding devices or imaging devices. The method comprises the steps of coupling an optical signal to be analyzed from an optical fiber into an input waveguide, splitting the optical signal to be analyzed, inputting the split optical signal into a plurality of micro-cavities, using constructive interference in the plurality of micro-cavities to produce optical resonance as a means for spectrally separating incoming signals and transferring the separated signals to different channels.

In another preferred embodiment, the present invention is an optical device for localizing light in a modal volume. The optical device comprises an optical fiber, an input waveguide, an optical coupler coupling the input waveguide to the optical fiber, an array of splitters connected to the input waveguide and a plurality of nanobeam cavities structured on a micro or nano scale, each tuned to operate at a different desired wavelength, wherein a linewidth of each nanobeam cavity resonator resonance (quality factor) determines the resolution of the optical device, the plurality of nanobeam cavities being adapted to strongly couple to the input waveguide. Constructive interference in the optical device produces optical resonance as a means of spectrally separating incoming signals, wherein separated signals are further transferred to different channels. The each of the plurality of nanobeam cavities may be a photonic crystal defect cavity, a photonic crystal nanobeam cavity, a ring resonator, a Fabry-Perot cavity, and any other geometry that produces an optical micro-cavity structure. The plurality of cavities may comprise one of the following: silicon, silica, silicon nitrate, diamond, doped glass, high-index glass, quartz, polymer, polydimethylsiloxane, InP, and III-V materials. The plurality of cavities may be formatted, for example, in arrays or in a matrix. The resonance frequency may be in the visible, in the near-infrared, in the mid-infrared, in the UV or in Gigahertz range. The resonance frequency of each cavity can be reconfigured, for example, by one of: mechanically, heating, carrier injection, and by nonlinear optical processes. The plurality of cavities may be individually or simultaneously excited, for example, by using optical fibers, tapered optical fibers, and through focused or non-focused optical beams. The signal from each cavity may be transferred, for example, to optical waveguides, arrays of optical fibers, imaging arrays or detector arrays. The optical device may comprise a spectrometer.

In still another embodiment, the present invention is an optical device for spectrally separating incoming signals using arrays of optical micro-cavities and mapping the spectrally separated signals to spatially separated wave-guiding devices or imaging devices. The optical device comprises means such as an optical coupler or couplers for inputting an optical signal to be analyzed to an input waveguide, means such as a splitter or splitters for splitting the optical signal to be analyzed, means such as an optical coupler for couplers for inputting the split optical signal into a plurality of micro-cavities, means for producing constructive interference in the plurality of micro-cavities to produce optical resonance as a means for spectrally separating incoming signals and means such as couplers and waveguides for transferring the separated signals to different channels. Each of said plurality of micro-cavities may comprise a silicon ridge waveguide and the means for producing constructive interference in the micro-cavities may comprise a plurality of nano-holes patterned along of the silicon ridge waveguides, wherein holes in the center of the cavity are largest and the holes taper monotonically to both ends.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

DETAILED DESCRIPTION OF THE PREFERRED EMBODIMENTS

Figures 1A, 1B, 1C:
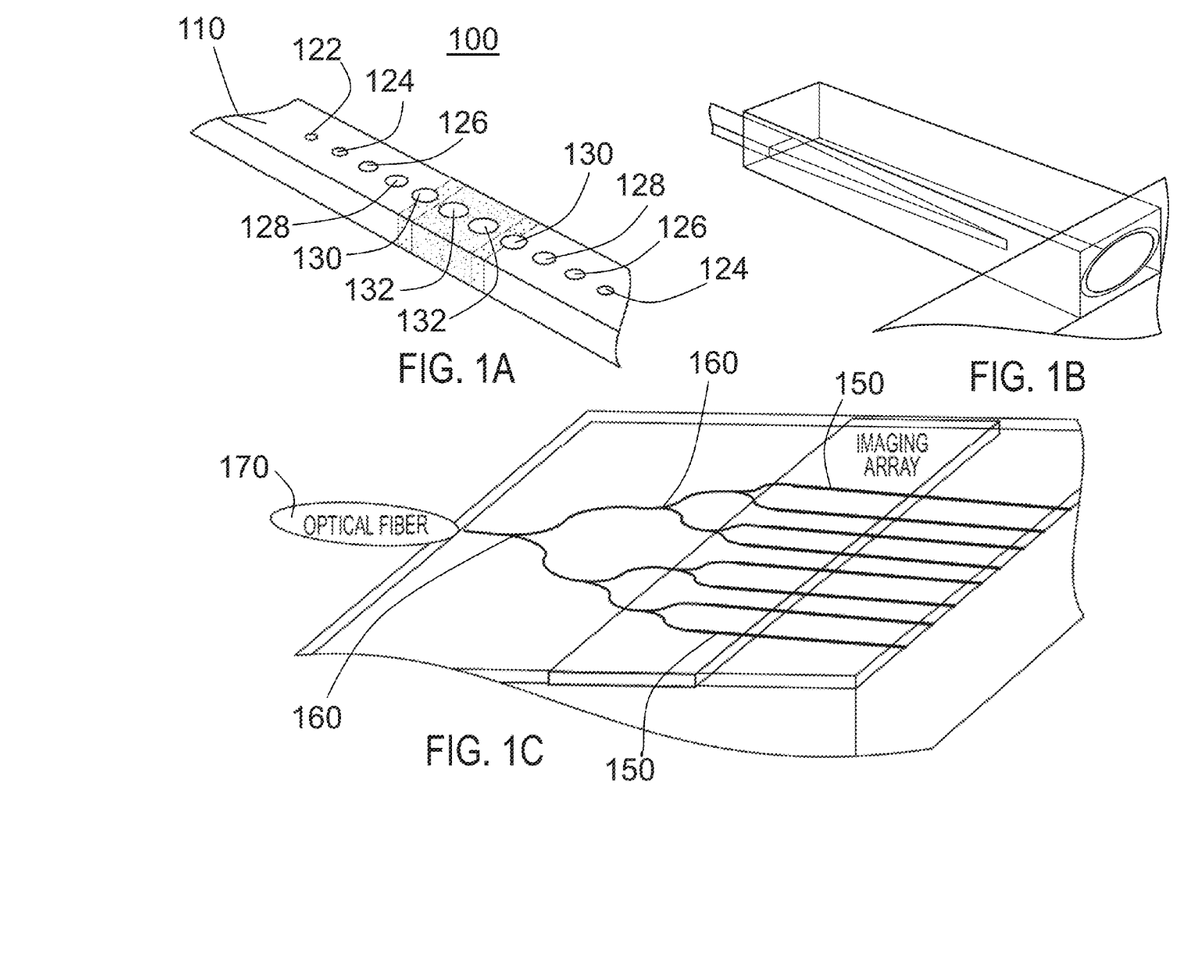
FIG. 1A is a schematics of a nanobeam cavity region in accordance with a preferred embodiment of the present invention.
FIG. 1B illustrates a nanobeam cavity coupling to a polymer pad which functions as a spot size converter in accordance with a preferred embodiment of the present invention.
FIG. 1C illustrates the overall device, including the PhC nanobeam cavities, polymer pads, on-chip beam splitters, beam couplers and a bump-bonded imaging array in accordance with a preferred embodiment of the present invention.

A mirror that provides a preferred Gaussian field distribution can be obtained by tapering conventional Bragg mirror by satisfying the following criteria. The periodicity of Bragg mirror is maintained—that is grating sections of the new mirror have constant periodicity. For example, if gratings are formed by etching holes along a waveguide, then the hole to hole distance are constant throughout the waveguide. Field distribution inside a conventional Bragg mirror goes as exp $(-\kappa x)$ where $\kappa$ terms as mirror strength. The cavity design of the present invention, such as is shown in FIG. 1A, has a Gaussian field distribution $\exp(-\sigma x^2)$, which can be achieved by making the mirror strength of the conventional Bragg mirror dependent on the position within the grating as $\kappa=\sigma x$. That is, the strength of grating section is increasing as a function of the distance from the center of the cavity. Such a mirror of the present invention may be referred to as a "modulated Bragg mirror".

Architecture of an Individual Nanobeam Cavity.

The schematic of a single PhC nanobeam cavity 100 is shown in FIG. 1A. It is comprised of a silicon ridge waveguide 110 with designed nano-holes 122-132 patterned along the waveguide. The holes 132 in the center of the cavity are largest and the holes 130, 128, 126, 124, 122 taper monotonically to both ends, where the nanobeam cavity 100 couples to a feeding silicon waveguide.

A large polymer pad is used (developed by NTT and IBM) to couple light from the feeding waveguide to the nanobeam cavity 100 and converts the spot size to the size that can be efficiently coupled to commercially available optical fibers (FIG. 1B). See, McNab, S. J., N. Moll, and Y. A. Vlasov, "*Ultra-low loss photonic integrated circuit with membrane-type photonic crystal waveguides,*" Optics Express, 11(22): p. 2927-2939 (2003) and Shoji T, T. T., Watanabe T, Yamada K, and Morita H, "*Low loss mode size converter from 0.3 μm square Si wire waveguides to single mode fibers,*" Electron. Lett., 38: p. 1669-1670 (2002).

Architecture of INAS.

As shown in FIG. 1C, the architecture of an integrated nanobeam cavity array ("INAS") in a preferred embodiment of the present invention is comprised of an array of waveguide-coupled nanobeam cavities 150. Waveguide splitters 160 (Y-splitters are depicted, by different types of couplers, including directional-couplers, etc) are used to bring the signal from the input waveguide into each cavity.

It is possible to have different layouts of an array of optical cavities—for example, all cavities can be side-coupled to one optical waveguide, or combination of the two methods can be used.

The Operation of the Spectrometer.

First, an optical signal to be characterized is coupled into the input waveguide, from fiber 170, using polymer waveguide couplers.

Second, the signal is distributed on chip using the network of splitters 160 and couplers.

Third, the signal is fed to each nanobeam cavity 150. Each nanobeam cavity 150 is tuned to operate at desired wavelength, which corresponds to one data point in the spectrum. The linewidth of each nanobeam resonator resonance (quality factor) determines the resolution of the spectrometer and can be adjusted as required by application.

Fourth, nanobeam resonators are designed so that they are strongly coupled to the feeding waveguides that are used to bring the light. In this way good transmission (sensitivity) can be achieved. The spectrum of unknown input signal is obtained by collecting signal from each nanobeam cavity in the array.

The Collection of the Signal.

The signal may be collected a variety of ways:

(1) In-plane by collecting the light transmitted through each nanobeam cavity (each cavity transmits only one wavelength) using output waveguides attached to an array of optical fibers at the output.

(2) In-plane by integrating detectors on the same chip so that optical signal can be converted to an electrical signal. Then, further processing of an electrical signal can be done on the same chip or off-chip.

(3) Out-of plane, by positioning a detector array on top of the array of nanobeam cavities. This can be done using bump-bonding, wafer bonding, etc for example. Nanobeam cavities naturally scatter light in the vertical direction and this light can be converted to electrical signal by the array of the detector.

(4) Out-of plane, using an objective lens and NIR camera.

Example of Design, Fabrication and Characterization.

We designed, fabricated and tested a single nanobeam device in a silicon-on-insulator (SOI) wafer with a 220 nm device layer on a 2 um buried oxide. The nanobeam cavity was made of silicon (n=3.46), and holes as well as the surrounding were assumed to be silica (n=1.45). The thickness of the nanobeam was 220 nm, and the period was 330 nm. A "modulated Bragg mirror" consists of 10 holes, with filling fractions linearly decreasing from 0.3 to 0.2. The coupler consists of 5 holes with filling fraction linearly decreasing from 0.2 to 0.

The idea, however, is general and can be realized in any material platform, with different periodicities, different lengths of modulated Bragg mirrors, tapers, and so on.

Electron beam lithography followed by reactive ion etching was used to realize devices. Different types of lithography (photolithography, deep-UV lithography, x-ray lithography, nano-imprint lithography, etc) can be used to define devices as well.

Figure 2A:
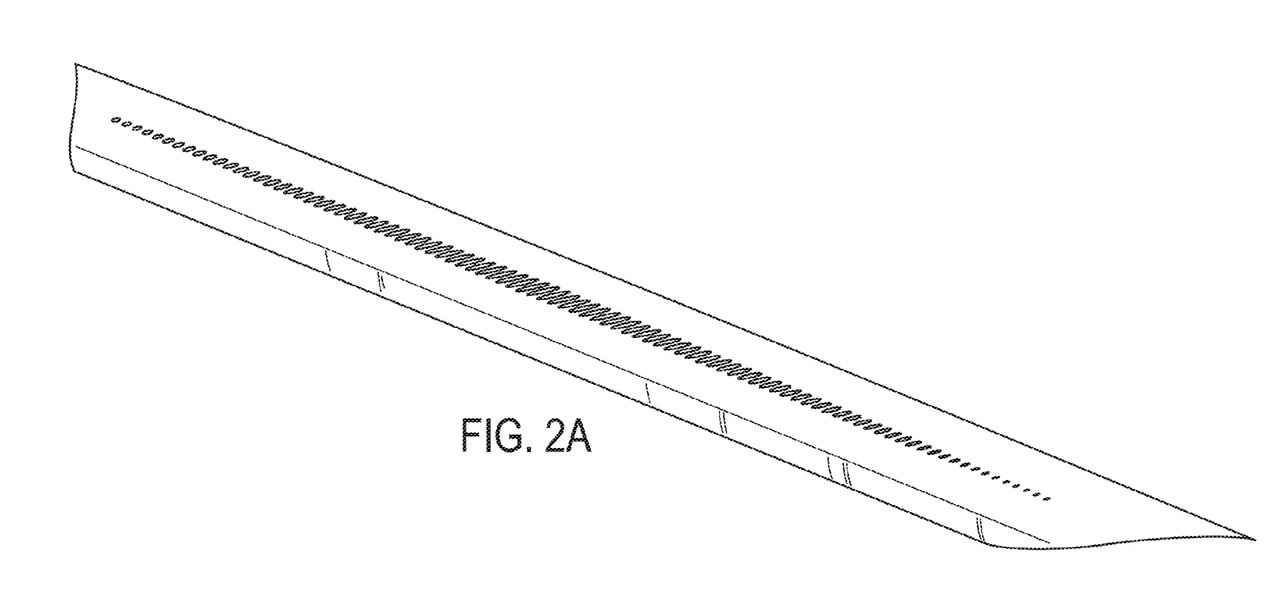
FIG. 2A is a perspective view of a nanobeam Photonic crystal cavity in accordance with a preferred embodiment of the present invention.
Figure 2B:
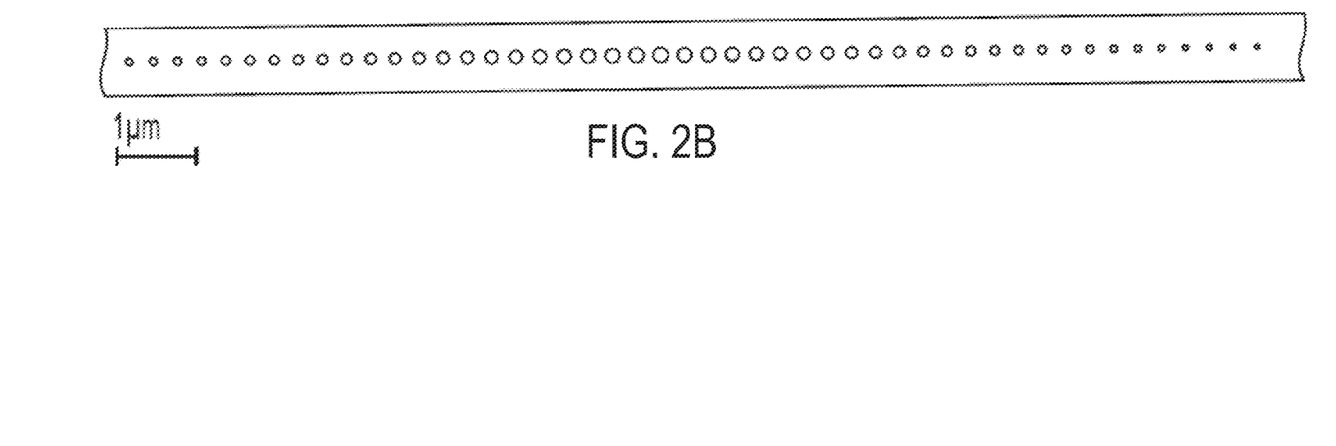
FIG. 2B is a top view of a nanobeam Photonic crystal cavity in accordance with a preferred embodiment of the present invention.
Figure 3:
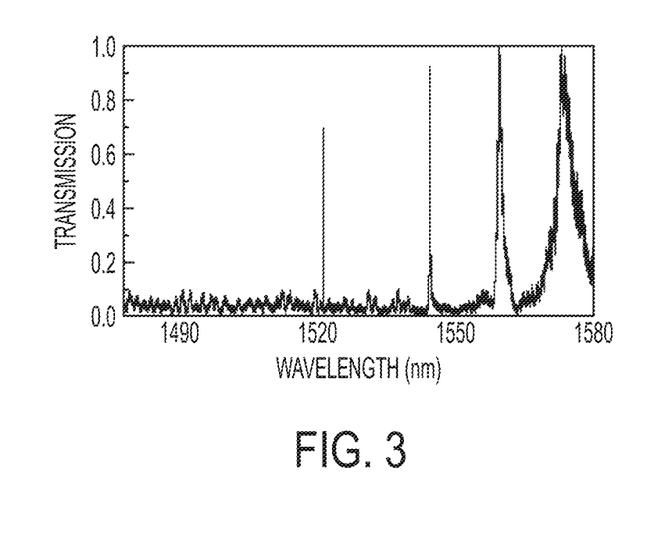
FIG. 3 is a transmission spectrum of a fabricated device in accordance with a preferred embodiment of the present invention measured at 100 microwatts input power. The transmission of the cavity mode at 1522 nm has a measured Q=80,000 with 73% transmission.
Figure 4A:
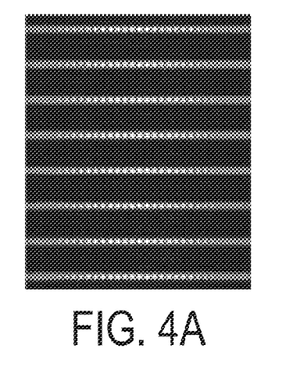
FIG. 4A is an image of an array of 8 nanobeam cavities in accordance with a preferred embodiment of the present invention.
Figure 4B:
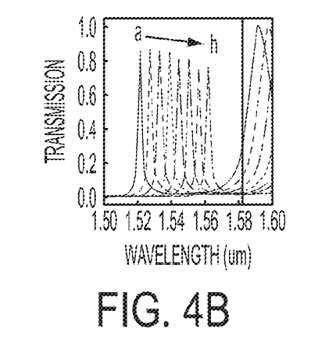
FIG. 4B is a transmission spectrum of nanobeam cavity from. The resonance of a-h shifts by ~0.5 nm each. The Q of each cavity is 1000, transmission is ~80%. The shaded region contains the band-edge modes.
Figure 5A:
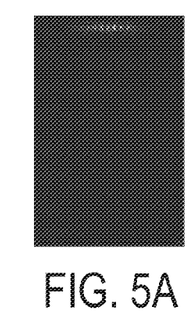
FIG. 5 illustrates the light-up of different nanobeams (a-h in FIG. 4B) at different wavelengths, when a waveguide mode is spitted equally and launched to the eight nanobeams shown in 4A.
Figure 5B:
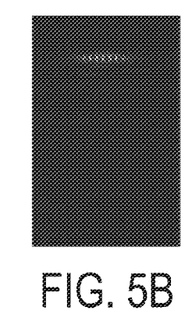
Figure 5C:
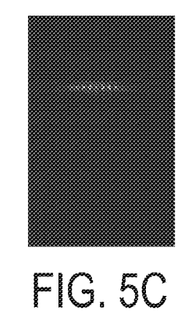
Figure 5D:
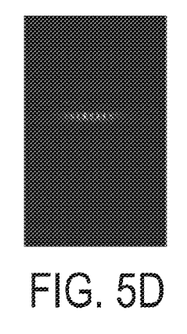
Figure 5E:
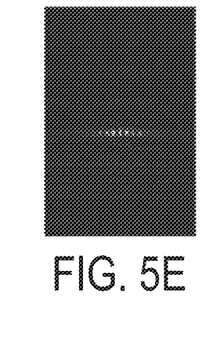
Figure 5F:
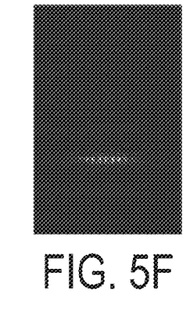
Figure 5G:
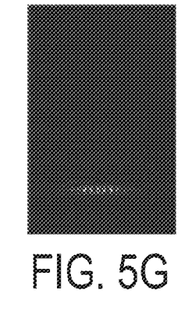
Figure 5H:
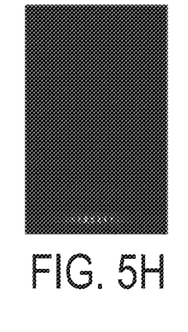

FIGS. 2A and 2B are illustrations of a fabricated device (nanobeam cavity region). Individual devices were characterized using tunable laser source from 1470 to 1580 nm. A tapered fiber (2.5 um² spot diameter) was used to couple light in and out of the polymer waveguide. FIG. 3A shows the transmission spectrum that we measured from one of the devices. A Q factor of 80,000 is measured with 73% on-resonance transmission.

Fabricated INAS consists of an array of 32 nanobeams. The cavities span roughly the wavelength range of ~64 nm. This was achieved by spacing cavity resonance 2 nm away from each of its nearest neighbors. Depending on application, INAS with larger or smaller number of cavities can be realized, spanning wider or smaller wavelength range.

The resolution with which each data point can be resolved is much better than 2 nm spectral spacing, and is defined by cavity Q which can be very large (Q~$10^6$). A large number of closely spaced nanobeam resonators can also be realized, further reducing the spacing between data points. Finally, using various types of wavelength tuning (discussed below), cavities can be tuned over the range between two data point which enables us to obtain continuous spectrum of the unknown input signal.

We have designed waveguide coupled cavities, with high transmission, suitable for collection using optical fibers (method 1). Alternatively, detectors can be integrated on top of the output waveguides and light can be converted to electrical signals directly on chip (method 2).

As a demonstration the overall device, we simulated an 8 nanobeam array in 2D. We use an effective index of 2.85 which produces about the same bandgap as in the 3D case. The width of the beam varies from 500 nm to 535 nm from (a) to (d) in FIG. 5. A waveguide mode is split equally and launched to the 8 nanobeams. We deliberately made the cavity Q~1000, so that the whole resonance tunneling would be possible using simulation.

Tuning the Resonances of the Nanobeam Cavities.

The nanobeam cavity array provides a discretized spectrum of the incoming signal. The step of data is determined by the resonance difference of the cavity and the resolution of each discretized data point is determined by the line-width of the cavity. Various methods can be applied to tune the resonance of each cavity and thus continuously reconstruct the spectrum of the signal. Here we mention, but not limited, four methods.

Optical Tuning:

Silicon, which current nanobeam cavities are made of, exhibits Kerr nonlinearity. Therefore, a strong pump light onto the silicon nanobeams would change the index of silicon. See, Belotti, M., et al., "*All-optical switching in silicon-on-insulator photonic wire nano-cavities*," Optics Express, 18(2): p. 1450-1461 (2010); Chong, H. M. H. and R. M. De La Rue, "*Tuning of photonic crystal waveguide microcavity by thermooptic effect*," Ieee Photonics Technology Letters, 16(6): p. 1528-1530 (2004); Marki, I., et al., "*Optically tunable microcavity in a planar photonic crystal silicon waveguide buried in oxide*," Optics Letters, 31(4): p. 513-515 (2006); Tanabe, T., et al., "*All-optical switches on a silicon chip realized using photonic crystal nanocavities*," Applied Physics Letters, 87(15) (2005).

Furthermore, a second cavity mode can be designed in nanobeam cavities, which can be used as the pump mode, and thus greatly reduce the pump power. This mode can be designed at the wavelength far away from the wavelength range of interest to the spectrometer, and thus spectrally filtered out from the spectrometer signal. Alternatively, this mode can be designed at orthogonal polarization to the spectrometer mode and filtered out using polarizers at output.

Electrical tuning: A p-i-n structure can be formed so that free carriers can be injected by electronic voltage. See, Schmidt, B., et al., "*Compact electro-optic modulator on silicon-on-insulator substrates using cavities with ultra-small modal volumes*," Optics Express, 15(6): p. 3140-3148 (2007) and Tanabe, T., et al., "*Low power and fast electro-optic silicon modulator with lateral p-i-n embedded photonic crystal nanocavity*," Optics Express, 17(25): p. 22505-22513 (2009). The injection of carriers would change the refractive index of silicon and therefore tune the resonance of the cavity.

Thermal tuning: Heating of the whole chip would change the refractive index of silicon through thermal optic effect, and therefore tune the resonance of the cavities.

Mechanical tuning: The cavity resonance can also be tuned through bending, deforming of the structure. Unterreithmeier, Q. P., E. M. Weig, and J. P. Kotthaus, "*Universal transduction scheme for nanomechanical systems based on dielectric forces*," Nature, 458(7241): p. 1001-1004 (2009); Iwamoto, S., et al., "*Observation of micromechanically controlled tuning of photonic crystal line-defect waveguide*," Applied Physics Letters, 88(1) (2006); Levy, O., et al., "*Mechanical tuning of two-dimensional photonic crystal cavity by micro Electro mechanical flexures*," Sensors and Actuators a-Physical, 139(1-2): p. 47-52 (2007); Frank I. W, D. P. B., McCutcheon M. W, Loncar M, "*Programmable photonic crystal nanobeam cavities*," Optics Express, 18: p. 8705-8712 (2010). The deformation can be provided by mechanical stress, by capacitance force, by optical force and etc.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for spectrally separating incoming signals using arrays of optical micro-cavities, and mapping the spectrally separated signals to spatially separated wave-guiding devices or imaging devices, the method comprising the steps of:
   coupling an optical signal to be analyzed from an optical fiber into an input waveguide;
   splitting said optical signal to be analyzed;
   inputting said split optical signal into a plurality of micro-cavities, wherein each of said micro-cavities comprises a silicon ridge waveguide having a plurality of holes patterned along the waveguide, wherein holes in the center of the cavity are largest and the holes taper monotonically to both ends;
   using constructive interference in said plurality of micro-cavities to produce optical resonance to spectrally separate incoming signals; and
   transferring said separated signals to different channels.

2. An optical device to localize light in a modal volume comprising:
   an optical fiber;
   an input waveguide;
   an optical coupler coupling said input waveguide to said optical fiber;
   an array of splitters connected to said input waveguide; and
   a plurality of nanobeam cavities, each tuned to operate at a different wavelength, said plurality of nanobeam cavities being adapted to strongly couple optical cavity modes to the input waveguide, and wherein each of said nanobeam cavities comprises a silicon ridge waveguide having a plurality of features patterned along the waveguide, wherein features in the center of the cavity are largest and the features taper monotonically to both ends;
   wherein constructive interference in said optical device produces optical resonance to spectrally separate incoming signals, wherein separated signals are further transferred to different channels.

3. An optical device according to claim 2, wherein said features comprise nano-holes patterned along the waveguide, wherein holes in the center of the cavity are largest and the holes taper monotonically to both ends.

4. An optical device according to claim 2, wherein a geometry of each of said plurality of nanobeam cavities is selected from one of the following: a photonic crystal defect cavity, a photonic crystal nanobeam cavity, a ring resonator, a Fabry-Perot cavity, and any other geometry that produces an optical micro-cavity structure.

5. An optical device according to claim 2, wherein each of said plurality of cavities comprises one of the following: silicon, silica, silicon nitrate, diamond, doped glass, high-index glass, quartz, polymer, polydimethylsiloxane, InP, and III-V materials.

6. An optical device according to claim 2, wherein said plurality of cavities are formatted in arrays.

7. An optical device according to claim 2 wherein said plurality of cavities are formatted in a matrix.

8. An optical device according to claim 2 wherein the resonance frequency is in the visible, in the near-infrared, in the mid-infrared, in the UV or in Gigahertz range.

9. An optical device according to claim 2 wherein the resonance frequency of each cavity can be reconfigured by one of: mechanically, heating, carrier injection, and by non-linear optical processes.

10. An optical device according to claim 2 wherein each of said plurality of cavities is individually excited.

11. An optical device according to claim 2 wherein said plurality of cavities are excited simultaneously.

12. An optical device according to claim 2, wherein said plurality cavities are excited using one of: optical fibers, tapered optical fibers, and through focused or non-focused optical beams.

13. An optical device according to claim 2, wherein a signal from each cavity is transferred to one of: optical waveguides, arrays of optical fibers, imaging arrays and detector arrays.

14. An optical device according to claim 2, wherein said optical device is a spectrometer.

15. An optical device for spectrally separating incoming signals using arrays of optical micro-cavities, and mapping the spectrally separated signals to spatially separated waveguiding devices or imaging devices, comprising:
 means for inputting an optical signal to be analyzed to an input waveguide;
 means for splitting said optical signal to be analyzed;
 means for inputting said split optical signal into a plurality of micro-cavities, wherein each of said micro-cavities comprises a silicon ridge waveguide having a plurality of holes patterned along the waveguide, wherein holes in the center of the cavity are largest and the holes taper monotonically to both ends;
 means for producing constructive interference in said plurality of micro-cavities to produce optical resonance to spectrally separate incoming signals; and
 means for transferring said separated signals to different channels.

16. An optical device according to claim 15, wherein each of said plurality of micro-cavities comprises a silicon ridge waveguide and said means for producing constructive interference in said micro-cavities comprises a plurality of nano-holes patterned along of said silicon ridge waveguides, wherein holes in the center of the cavity are largest and the holes taper monotonically to both ends.

* * * * *